United States Patent [19]
Yasuda et al.

[11] Patent Number: 5,218,015
[45] Date of Patent: Jun. 8, 1993

[54] HARDENING AGENT COMPOSITION, METHOD OF PREPARING THE SAME AND THERMOSETTING EPOXY RESIN COMPOSITION BASED ON SURFACE TREATED ZEOLITES

[75] Inventors: Akira Yasuda, Saitama; Rihei Nagase, Tokyo, both of Japan

[73] Assignee: Somar Corporation, Tokyo, Japan

[21] Appl. No.: 592,744

[22] Filed: Oct. 4, 1990

[30] Foreign Application Priority Data

Oct. 6, 1989 [JP] Japan ................... 1-261818

[51] Int. Cl.$^5$ ............... C08G 59/68; C08L 63/00
[52] U.S. Cl. ..................... 523/210; 523/211; 523/435; 524/450; 252/182.13; 252/182.14; 252/182.23; 252/182.28
[58] Field of Search .............. 523/210, 211, 435; 524/450; 252/182.14, 182.23, 182.28, 182.13

[56] References Cited

U.S. PATENT DOCUMENTS

| | | | |
|---|---|---|---|
| 3,036,980 | 5/1962 | Dunham et al. | 260/31.4 |
| 3,170,890 | 2/1965 | Boyd et al. | 523/435 |
| 3,395,105 | 7/1968 | Washburn et al. | 523/211 |
| 3,396,117 | 8/1968 | Schuetze | 523/211 |
| 3,533,987 | 10/1970 | Giambra et al. | 523/211 |
| 4,374,943 | 2/1983 | Williams | 523/211 |
| 4,624,998 | 11/1986 | Keil | 525/476 |
| 4,741,779 | 5/1988 | Mita et al. | 524/450 |
| 4,758,619 | 7/1988 | Mita et al. | 524/450 |

FOREIGN PATENT DOCUMENTS

| | | |
|---|---|---|
| 4317654 | 8/1963 | Japan . |
| 60-4524 | 6/1983 | Japan . |
| 3161018 | 6/1983 | Japan . |
| 61-113614 | 10/1986 | Japan . |

OTHER PUBLICATIONS

*Handbook of Epoxy Resins,* Lee and Neville, McGraw-Hill, Inc. Copyright 1967.

Primary Examiner—Melvyn I. Marquis
Assistant Examiner—Frederick Krass
Attorney, Agent, or Firm—Sughrue, Mion, Zinn, Macpeak & Seas

[57] ABSTRACT

Disclosed is a hardening agent composition for epoxy resins in the form of powdery grains, comprising a low-reactive hardening agent, a hardening promoter, a zeolite and at least one additive selected from a water-repellent fine silica powder, a silane coupling agent and a polysiloxane compound, whereby the additive is adhered to the surfaces of the powdery grains. The composition has a retarded water-absorbing property and has improved storage stability, when blended with an epoxy resin to form a thermosetting epoxy resin composition. Methods for preparing the powdery hardening agent composition are also disclosed.

18 Claims, No Drawings

HARDENING AGENT COMPOSITION, METHOD OF PREPARING THE SAME AND THERMOSETTING EPOXY RESIN COMPOSITION BASED ON SURFACE TREATED ZEOLITES

FIELD OF THE INVENTION

The present invention relates to a hardening agent composition for epoxy resins, which has both excellent storage stability and excellent thermosetting reactivity. The present invention also relates to a method of manufacturing the hardening agent composition and to a thermosetting epoxy resin composition containing the hardening agent composition.

BACKGROUND OF THE INVENTION

Hitherto, various thermosetting epoxy resin compositions comprising an epoxy resin, a low-reactive hardening agent and a hardening promoter have been known. Such thermosetting epoxy resin compositions are required to have excellent storage stability in order that the hardening reaction of the compositions does not proceed during storage of the compositions. Additionally, such compositions are required to have excellent thermosetting reactivity in order that the compositions may rapidly harden under heat. However, in such thermosetting epoxy resin compositions, storage stability and thermosetting reactivity properties are, in theory, somewhat contradictory to each other. In general, therefore, it is difficult for such compositions to satisfy both properties of high storage stability and high thermosetting reactivity. In fact, no composition is known which can adequately satisfy both of these properties.

For instance, in order to improve storage stability, formation of complexes with a reaction promoter or formation of inclusion compounds with a cyclodextrin has been proposed. In these cases, however, there is a drawback in that the hardening reactivity of the resin composition is undesirably lowered. On the other hand, incorporation of microcapsules containing a reaction promoter into the resin composition has also been proposed (JP-B-43-17654—the term "JP-B" as used herein means an "examined Japanese patent publication"). In this case, however, there is a problem in that the cost of manufacturing the composition is unacceptably high for practical purposes. Additionally, there is another problem in that the microcapsules incorporated are easily broken. Incorporation of a hardening promoter which is stable to heat and which is latent-hardening, for example, a combination comprising tetraphenyl phosphonium tetraphenyl borate and triphenylphosphine (JP-A-61-113614—the term "JP-A" as used herein means an "unexamined published Japanese patent application") or an addition compound obtained by reacting a tertiary amine compound having a hydroxyl or mercapto group and a polyfunctional epoxy compound (JP-A-60-4524), into the resin composition has also been proposed. However, the illustrated techniques also have some drawbacks, i.e., the composition having good storage stability is unsatisfactory with respect to the hardening reactivity thereof, while the composition having satisfactory hardening reactivity has an unsatisfactory storage stability.

JP-A-63-161018 discloses a method of obtaining a thermosetting epoxy resin composition having both excellent storage stability and excellent hardening reactivity, in which a low-reactive hardening agent, a hardening promoter and a zeolite are blended while the hardening agent and the hardening promoter are melted, the resulting blend is cooled and solidified, the resulting solid is powdered into a fine powder, and the powder is incorporated into an epoxy resin composition. However, since the powder which is used as a hardening agent in this method has a water-absorbing property caused by the presence of the zeolite, the storage stability property is still insufficient. Accordingly, where the powder is left under conditions of a high humidity for a long period of time, the powder absorbs moisture. When such a wet powder is combined with an epoxy resin and the resulting epoxy resin composition is used as a powdery coating composition, it has been found that the coated film formed by the composition often causes some outward appearance abnormalities. Further, the hardening reactivity of the powdery coating composition is not always uniform.

SUMMARY OF THE INVENTION

One object of the present invention is to provide a hardening agent composition comprising a low-reactive hardening agent, a hardening promoter and a zeolite, which has a retarded water-absorbing property and has improved storage stability.

Another object of the present invention is to provide a method of preparing the hardening agent composition, and also to provide a thermosetting epoxy resin composition containing the hardening agent composition.

In accordance with the above objects and advantages, the present invention relates to a hardening agent composition for epoxy resins in the form of powdery grains, comprising a low-reactive hardening agent, a hardening promoter, a zeolite and at least one additive selected from a water-repellent fine silica powder, a silane coupling agent and a polysiloxane compound, whereby the additive is adhered to the surfaces of the powdery grains.

The present invention also relates to a method of producing a powdery hardening agent composition, comprising blending a low-reactive hardening agent, a hardening promoter and a zeolite, while melting the hardening agent and the hardening promoter, cooling and solidifying the resulting blend, and finely powdering the resulting solid in the presence of at least one additive selected from a water-repellent fine silica powder, a silane coupling agent and a polysiloxane compound to obtain powdery grains, whereby the additive is adhered to the surfaces of the powdery grains.

An alternative embodiment of the method of producing the powdery hardening agent composition comprises blending a low-reactive hardening agent, a hardening promoter and a zeolite, while melting the hardening agent and the hardening promoter, cooling and solidifying the resulting blend, and then finely powdering the resulting solid to obtain powdery grains, and thereafter blending at least one additive selected from a water-repellent fine silica powder, a silane coupling agent and a polysiloxane compound with the powdery grains, whereby the additive is adhered to the surfaces of the powdery grains.

The present invention also relates to a thermosetting epoxy resin composition comprising an epoxy resin and a hardening agent composition in the form of powdery grains, in which the hardening agent composition is as defined above.

DETAILED DESCRIPTION OF THE INVENTION

The "low-reactive hardening agent" used in the present invention is defined as a hardening agent which hardly causes a hardening reaction of an epoxy resin by itself when it is blended singly with a molten epoxy resin. More specifically, the low-reactive hardening agent has a gelling time at 150° C. of about more than 180 seconds, when mixed with an epoxy resin in an equivalent addition amount. The low-reactive hardening agent (which may hereinafter be referred to merely as a "hardening agent") for use in the invention may be any known one, including, for example, solid polycarboxylic acids, organic acid anhydrides, phenol-novolac type or cresol-novolac type resin hardening agents and hydrazide compounds.

The hardening promoter for use in the present invention includes phosphine-type or amine-type hardening promoters, which are well known in this technical field. Suitable phosphine-type hardening promoters include, for example, triphenylphosphine, diphenylphosphine and tri-m-tolylphosphine; and suitable amine-type hardening promoters include, for example, imidazole, imidazoline, dicyanediamide and modified compounds thereof, and 1,8-diazabicyclo(5,4,0)undecene-7,2-(dimethylaminomethyl)phenol, 2,4,6-tris(dimethylaminomethyl)phenol and piperidine.

Various known zeolites can be employed in the present invention. For instance, hydrogen-type or salt-type (for example, sodium, calcium, magnesium or the like metal salt-type) zeolites can be employed. Preferred are salt-type zeolites; and especially preferred is a calcium salt-type synthetic zeolite (e.g., Molecular sieve 3A, 4A, 5A, 13X of Union Showa K.K. and Fuji-Davison Chemical Ltd., Zeolum A-3, A-4, A-5, F-9 of TOSOH Corp.). The zeolite for use in the invention has a mean grain size of, preferably from 0.1 to 50 microns, more preferably from 1 to 20 microns.

The combination of the zeolite and the hardening promoter used in the present invention is selected so that the hardening promoter molecules do not completely penetrate into the fine pores of the zeolite, but may merely adhere to the surfaces of the zeolite grains because of the affinity of the zeolite to the hardening promoter. Accordingly, the hardening promoter to be combined with the zeolite in accordance with the present invention generally has a larger molecular size than the diameter of the fine pores of the zeolite grains. Preferred examples of such combinations are mentioned below.

(1) Zeolite having a pore diameter of approximately 5 Å or less is combined with:
triphenylphosphine, diphenylphosphine, 1-methylimidazole, 2-methylimidazole, 1-benzyl-2-methylimidazole, 1-phenylimidazole, 2-phenylimidazole, 1,8-diazabicyclo(5,4,0)-undecene-7,2-(dimethylaminomethyl)phenol, 2,4,6-tris(dimethylaminomethyl)phenol.

(2) Zeolite having a pore diameter of approximately 10 Å is combined with:
triphenylphosphine, tri-m-tolylphosphine, 2,4-diamino-6-[2'-methylimidazolyl(1)]ethyl-S-triazine.

In order to ascertain whether or not the hardening promoter as blended with a zeolite has completely penetrated into the fine pores of the zeolite, the zeolite is surface-treated with a molten fluid of the hardening promoter, blended with an epoxy resin and heated. In this case, where the heated epoxy resin does not substantially harden or, if hardened, the hardening reaction is extremely slow, it is concluded that the hardening promoter has penetrated into the fine pores of the zeolite grains. On the other hand, where the heated epoxy resin hardened by a rapid hardening reaction, it is concluded that the hardening promoter does not substantially completely penetrate into the fine pores of the zeolite grains, but has adhered to the surfaces thereof. Accordingly, the preferred combinations of zeolite and hardening promoter for use in the present invention may easily be obtained by one of ordinary skill in the art by carrying out the above-mentioned simple experiment.

The amount of the hardening promoter used in the present invention is preferably from 3 to 50 parts by weight, more preferably from 10 to 30 parts by weight, to 100 parts by weight of zeolite. The minimum amount of the low-reactive hardening agent used in the present invention is an amount effective to cover the zeolite to be added to the hardening agent composition of the invention. Generally speaking, the amount of the low-reactive hardening agent is on the order of at least 10 parts by weight, preferably from 50 to 500 parts by weight, to 100 parts by weight of zeolite.

The hardening agent composition of the present invention may be prepared as follows. A low-reactive hardening agent, a hardening promoter and a zeolite are first blended while the low-reactive hardening agent and the hardening promoter are melted. For instance, all of the low-reactive hardening agent, hardening promoter and zeolite are heated for a time such that the low-reactive hardening agent and the hardening promoter are melted and all the components are blended under the molten state; or alternatively, a zeolite is added to a molten hardening promoter and thereafter a low-reactive hardening agent is added to the resulting blend, whereupon the hardening agent is melted and blended with the other two. The blending temperature can be defined in functional terms, i.e., such that both the low-reactive hardening agent and the hardening promoter are melted at the blending temperature. In general, the blending temperature usually falls within the range of from 80° to 180° C.

In accordance with the present invention, the molten blend obtained as mentioned above is then cooled to room temperature and solidified, and thereafter the solid is finely powdered in the presence of a particular additive; or alternatively, the cooled and solidified solid is finely powdered and then blended with an additive. The additive for use in the present invention in the above-mentioned procedure is selected from a water-repellent fine silica powder, a silane coupling agent and a polysiloxane compound.

The water-repellent fine silica powder for use in the invention comprises fine silica grains having hydrophobic groups (hydrocarbon groups (e.g., —$C_3$, —$C_8H_{17}$)) bonded on the surfaces thereof, which are well known in this technical field. The silica grains have a primary mean grain size of from 10 to 100 nm, preferably from 10 to 30 nm. There are many commercially available products, e.g., Aerosil R-972, R-805, R-202 of Nippon Aerosil K.K., Nipsil SS-10 of Nippon Silica Industry Co., Ltd., CAB-O-Sil RS-720 of Cabot Japan K.K.

The silane coupling agent for use in the invention is a silicon compound which has a polar group in the molecule and which is liquid or solid at room temperature. Such a compound is well known in this technical field.

In this case, the polar group includes, for example, an amino group, an amido group, a carboxyl group, an alkoxy group and a halogen. In general, the silane coupling agent is represented by $R_nSiX(4-n)$ in which R is a non hydrolyzable organic group (e.g., β-(3,4-epoxycyclohexyl)ethyl, γ-glycidoxypropyl, γ-mercaptopropyl, γ-aminopropyl, N-β-(aminoethyl)-γ-aminopropyl, γ-ureidopropyl), X is a hydrolyzable group, for example, an alkoxy group (e.g., methoxy, ethoxy), and $\geq 3$. Specific examples of usable silane coupling agents are mentioned below:

(1) $NH_2(CH_2)_2NH(CH_2)_3Si(OCH_3)_2$
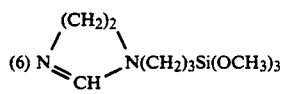

(2) $NH_2(CH_2)_2NH(CH_2)_3Si(OCH_3)_3$
(3) $NH_2(CH_2CH_2NH)_2(CH_2)_3Si(OCH_3)_3$
(4) $NH_2(CH_2)_2NHCH_2Ph(CH_2)_2Si(OCH_3)_3$
  (Ph: phenyl group)
(5) $(C_{17}H_{35}COO)_2Si(OCH_2CH_3)_2$ (6) 
$$N \underset{CH}{\overset{(CH_2)_2}{\diagup \diagdown}} N(CH_2)_3Si(OCH_3)_3$$

(7) $(OCH_3)_3SiNHSi(OCH_3)_3$
(8) $NH_2(CH_2)_3Si(OC_2H_5)_3$
(9) $NH_2(CH_2)_2NH(CH_2)_3Si(OCH_3)_3$
(10) $Cl(CH_2)_3Si(OCH_3)_3$
(11) $NH_2CONH(CH_2)_3Si(OC_2H_5)_3$
(12) $NH_2(CH_2)_3Si(OC_2H_5)_3$
(13) $NH_2(CH_2)_2NH(CH_2)_3Si(OCH_3)_3$

The polysiloxane compound for use in the present invention is a compound which has a polysiloxane bond in the molecule and which is liquid or solid at room temperature. It includes various modified silicone oils which have heretofore been well known. For example, the following compounds are illustrative:

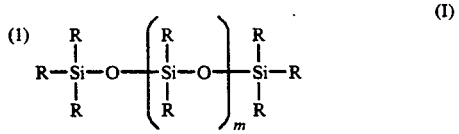

wherein R represents a monovalent hydrocarbon group having 1 to 7 carbon atoms, such as methyl, ethyl, propyl, vinyl or phenyl group; and m represents a positive integer;

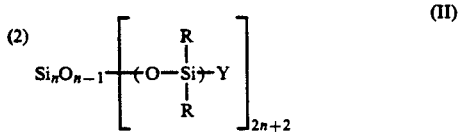

wherein R has the same meaning as defined above in formula (I); Y represents a substituent, such as —H, —OH, —OR¹,

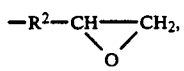

—R²—NH₂, —R²—COOH, or —R²—OH; R¹ represents a monovalent $C_{1-3}$ aliphatic or $C_{6-7}$ aromatic hydrocarbon group; R² represents a divalent $C_{1-3}$ aliphatic or $C_{6-7}$ aromatic hydrocarbon group; and m and n each represents a positive integer;

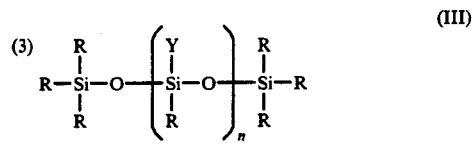

wherein R, Y and n have the same meanings as defined above in formulae (I) and (II);

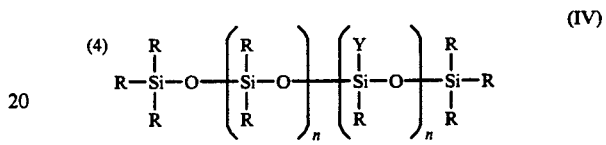

wherein R, Y and n have the same meanings as defined above in formulae (I) and (II).

In the above-mentioned compounds, the substituent Y may be positioned either in the body of the molecular chain or at the terminal of the molecular chain.

The amount of the additive to be added is preferably from 0.1 to 5% by weight, more preferably from 0.5 to 3.0% by weight, to the total weight of the hardening agent composition.

The powdery hardening agent composition of the present invention has the above-mentioned additive adhered to the surfaces of the powdery grains of the composition. Accordingly, because of the water-repellent property of the additive of itself, the composition has an extremely retarded water-absorbing property, and therefore has excellent storage stability.

In order to obtain a thermosetting epoxy resin composition which contains the hardening agent composition of the invention, the powdery hardening agent composition is added and blended with a molten epoxy resin. In this case, any other hardening agent or hardening promoter may be added to the epoxy resin composition in a desired amount, if necessary. The blending temperature for preparing the epoxy resin composition is that at which the epoxy resin to be blended may be melted. In general, the temperature may be the softening point of the epoxy resin to be blended (where two or more epoxy resins are used in combination, the temperature is the softening point of the mixed epoxy resins), or may be a temperature higher than the softening point by 5° to 30° C., preferably 5° to 15° C. The thus obtained molten blend is cooled, solidified and finely powdered to give a powdery thermosetting epoxy resin composition. The thus obtained composition rapidly hardens, when heated to a temperature higher than the blending temperature. For instance, when the blending temperature is 110° C., the resin composition may harden when heated up to 130° to 200° C.

The epoxy resin is not particularly limited, and is generally of the type used in preparing known epoxy resin compositions. More specifically, the epoxy resin has at least two epoxy groups in one molecule and the number average molecular weight is generally 500 to 10,000, preferably 800 to 5,000. For instance, various epoxy resins of bisphenol-A type, bisphenol-S type, bisphenol-F type, phenol-novolac type or cresol-novolac type, as well as glycidyl-ester type epoxy resins, glycidyl-amine type epoxy resins, alicyclic epoxy resins, linear aliphatic epoxy resins, heterocyclic epoxy resins and halogenated (especially brominated) epoxy resins, may be used. The epoxy resin may be used singly or as a mixture of two or more. The epoxy resin for use in the present invention may be any one which is solid at room temperature, or it may be a mixture of a solid epoxy resin and a proper amount of a liquid epoxy resin, as long as the mixture is solid at room temperature.

Regarding the proportions of the ingredients comprising the thermosetting epoxy resin composition of the present invention, the low-reactive hardening agent is preferably present in an amount of from 0.5 to 1.5, more preferably from 0.6 to 1.3, as the functional group equivalent thereof, taking the epoxy equivalent of the epoxy resin as 1 (one) (where a combination of plural epoxy resin is used, the epoxy equivalent of the mixture of plural epoxy resins is used). The amount of the hardening promoter in the resin composition is preferably from 0.02 to 20 parts by weight, more preferably from 0.1 to 10 parts by weight, to 100 parts by weight of the epoxy resin. The amount of the zeolite in the resin composition is preferably from 0.2 to 100 parts by weight, more preferably from 0.5 to 50 parts by weight, to 100 parts by weight of the epoxy resin. The weight ratio of the zeolite to the hardening promoter is preferably from 2/1 to 30/1, more preferably from 3/1 to 10/1. The resin composition of the present invention may contain further conventional auxiliary additives, for example, a filler such as silica or calcium carbonate or a flow-adjusting agent, if desired.

As described above, the hardening agent composition of the present invention has a specific additive adhered to the surfaces of the powdery grains of the composition and therefore the water-absorbing property, caused by the zeolite component, is noticeably retarded. As a result, the composition is seen to have remarkably elevated storage stability. Accordingly, even if the composition is left under conditions of high humidity for a long period of time, it substantially does not absorb the moisture in air. Therefore, when the hardening agent composition is blended with an epoxy resin to form a powdery coating composition and the resulting composition is used for forming a coating film, the film to be formed from the composition is free from any outward appearance abnormalities, and additionally, the hardening reactivity of the coating composition is not dispersed but is uniform.

In the epoxy resin composition of the present invention, since a hardening promoter adheres to the surfaces of zeolite grains and the surfaces thereof are further protected with a low-reactive hardening agent (it is considered that direct contact of the hardening promoter and the low-reactive hardening agent to the epoxy resin is substantially avoided), the epoxy resin composition has extremely excellent storage stability. Moreover, the resin composition of the invention rapidly hardens when heated at a high temperature. When the resin composition of the invention is heated at a high temperature, the hardening promoter and the low-reactive hardening agent are believed to be brought into contact with the epoxy resin because of the thermal motion of the components under heat. Additionally, since the hardening promoter used in the present invention has a rapid hardening reactivity with the mixture comprising the epoxy resin and the hardening agent in the composition, the resin composition of the invention may rapidly harden under heat.

The resin composition of the present invention can widely be utilized in various fields, for example, as a powdery coating composition, an insulating sealant material for electrical parts or electronic parts, and a thermosetting shaping material, like other conventional epoxy resin compositions. The present invention will be explained in more detail by way of the following Examples, which, however, are not intended to restrict the scope of the present invention.

Components used in the following Examples are as follows:

Epoxy Resin A

Epikote 1004 (manufactured by Yuka Shell Epoxy K.K.) (bisphenol-A type epoxy resin having a softening point of 97° C., a number average molecular weight of 1,600 and an epoxy equivalent of 925).

Epoxy Resin B

EOCN-104 (manufactured by Nippon Kayaku Co., Ltd.) (ortho-cresol-novolak type epoxy resin having a softening point of 95° C., a number average molecular weight of 1,400 and an epoxy equivalent of 235).

Zeolite A

Molecular seive 13X (manufactured by Union Showa K.K.)(having a pore diameter of about 10 Å, a mean grain size of about 5 microns and a maximum grain size 10 microns or less).

Zeolite B

Molecular seive 5A (manufactured by Union Showa K.K )(having a pore diameter of about 5 Å, a mean grain size of about 5 microns and a maximum grain size of 10 microns or less).

Phenol-Novolac Resin

Tamanol 754 (manufactured by Arakawa Chemical Industry Co.)(phenol-novolac resin having a softening point of 100° C. and a phenolic hydroxyl equivalent of 105).

Hardening Promoter A

Triphenylphosphine PP-360 (manufactured by K.I Chemical Industry Co., Ltd.).

Hardening Promoter B

2-Methylimidazole.

Methods of measuring the properties of samples shown in Tables below and methods of evaluating them are as follows:

150° C. Gelling Time ($T_1$)

The thermosetting time is measured in accordance with JIS C 2104.

Horizontal Melt Flow Rate ($R_1$)

1 g of a sample to be tested is shaped into a tablet having a diameter of 16 mm and this is placed on a soft steel plate positioned horizontally. The plate with the tablet is melted and gelled in an oven heated at 140° C., whereupon the spread diameter (l) of the molten and gelled sample is measured. Accordingly, the horizontal melt flow rate ($R_1$) is calculated from the following formula:

$(R_1)(\%) = (l-16)/16 \times 100$

Storage Stability

A fresh sample to be tested is placed in an incubator set at 40° C. After it has been kept in the incubator for a pre-determined period of time (2 weeks or 5 weeks), it is taken out therefrom and cooled to room temperature. Next, the thus stored sample is tested to obtain the gelling time and the horizontal melt flow rate. On the basis of the thus measured values, the gelling time retentivity (T) and the horizontal melt flow rate retentivity (R) are calculated from the following formulae. Where the values of retentivity as calculated are higher, the sample tested has a higher storage stability.

$T(\%) = T_2/T_1 \times 100$ where $T_1$ is a gelling time of a fresh sample; and $T_2$ is a gelling time of a sample stored for 2 weeks or 5 weeks at 40° C.

$R(\%) = R_2/R_1 \times 100$ where $R_1$ is a horizontal melt flow rate of a fresh sample; and $R_2$ is a horizontal melt flow rate of a sample stored for 2 weeks or 5 weeks at 40° C.

Evaluation of Storage Stability

A mean value (X) of each of the above-mentioned retentivity values (T) and (R) of a sample stored for 2 weeks at 40° C. is calculated, and the sample tested is evaluated on the basis of the following rankings.

⊚ ... X ≧ 90
○ ... 90 > X ≧ 50
Δ ... 70 > X ≧ 50
× ... X < 50

Environmental Test 200 g of a fine powdery hardening agent composition sample to be tested is placed in a 50 micron-thick polyethylene bag (500 mm × 250 mm), and the upper mouth of the bag is tightened with a rubber band. The bag containing the sample is left in an environmental test chamber having a constant temperature of 30° C. and a constant humidity of 60% for 2 weeks.

Evaluation of Outward Appearance of Coated Film

A soft steel plate test piece (60 mm × 60 mm × 3 mm) having clean surfaces, which has been degreased by dipping in acetone and then dried, is placed in an electric drying oven (set at 150° C. or 200° C.) for 30 minutes for pre-heating. The thus pre-heated test piece is then coated with a pre-determined powdery epoxy resin coating composition sample to be tested by a flow-dip coating method to form a film having a thickness of about 500 microns thereon. Then, the thus coated test piece is returned back to the drier furnace having the same temperature as the pre-heating temperature, and the coated film is hardened therein for a pre-determined period of time. After the film has hardened, the test piece with the hardened film is taken out from the furnace and the outward appearance of the coated test piece is visually observed with the naked eye. Accordingly, the coated film on the test piece is evaluated on the basis of the following rankings with respect to the smoothness and the final appearance of the coated sample.

Rank A: Smoothness and final appearance are good.
Rank $B_1$: Surface is somewhat rough.
Rank $B_2$: Surface is a citron-like surface, or surface is fairly rough.
Rank C: Surface has been foamed.

In the Tables below, evaluation of coat appearance (1) indicates the result of the coat as formed on the test piece pre-heated at 150° C., while evaluation of coat appearance (2) indicates that of the coat as formed on the test piece pre-heated at 200° C. The hardening conditions are 150° C. for 30 minutes for case (1) and are 200° C. for 10 minutes for case (2).

MANUFACTURE OF HARDENING AGENT COMPOSITIONS

Manufacture Example 1

A blend comprising 180 parts by weight of Phenol-Novolak Resin, 100 parts by weight of Zeolite A and 20 parts by weight of Hardening Promoter A was melted and kneaded in an oil jacket-combined universal stirring container at a resin-melting temperature of 130° C. for a period of 60 minutes and then cooled. The thus solidified blend was then coarsely pulverized with an atomizer and then finely powdered with a pin-mill type powdering machine to obtain a fine powder having a size of Tyler sieve of 100-mesh cut. The fine powder is called Hardening Agent Composition A.

Manufacture Example 2

A blend comprising 180 parts by weight of Phenol-Novolak Resin, 100 parts by weight of Zeolite B and 20 parts by weight of Hardening Promoter A was processed in the same manner as in Manufacture Example 1 to obtain a fine powder having a size of Tyler sieve of 100-mesh cut. The fine powder thus obtained is called Hardening Agent Composition B.

Manufacture Example 3

A blend comprising 180 parts by weight of Phenol-Novolak Resin, 100 parts by weight of Zeolite B and 10 parts by weight of Hardening Promoter B was processed in the same manner as in Manufacture Example 1 to obtain a fine powder having a size of Tyler sieve of 100-mesh cut. The fine powder thus obtained is called Hardening Agent Composition C.

Comparative Example 1

A fresh sample of Hardening Agent Composition A was blended with epoxy resins as indicated in Table 1 below at a resin-melting temperature of 110° C. by the use an extruder. The resin blend was then cooled and solidified. The resulting solid was roughly ground with an atomizer and then finely powdered with a pin-mill type powdering machine to obtain a coating composition sample (No. 1) having a size of Tyler sieve of 60-mesh cut. The results of evaluation of the powdery coating composition are shown in Table 1.

Comparative Example 2

A fresh sample of Hardening Agent Composition B was blended with epoxy resins as indicated in Table 1 and then processed in the same manner as in Comparative Example 1 to obtain a coating composition sample (No. 2). The results of evaluation of the powdery coating composition are shown in Table 1.

Comparative Example 3

Hardening Agent Composition A was subjected to the environmental test conditions described above, and the thus tested sample is called Hardening Agent Composition A-1. Using this, a coating composition sample (No. 3) as indicated in Table 1 below was obtained in the same manner as in Comparative Example 1. The results of evaluation of the sample are shown in Table 1.

Comparative Example 4

Hardening Agent Composition B was subjected to the environmental test conditions described above, and the thus tested sample is called Hardening Agent Composition B-1. Using this, a coating composition sample (No. 4) as indicated in Table 1 below was obtained in the same manner as in Comparative Example 1. The results of evaluation of the sample are shown in Table 1.

Example 1

A water-repellent fine silica powder (AEROSIL R-972: manufactured by Nippon Aerosil K.K.) was added to a fine powder of Hardening Agent Composition A in an amount of 1% by weight of the latter fine powder and dry-blended in a Henschel mixer. The resulting fine powder blend was subjected to the environmental test conditions described above, and the thus tested sample is called Hardening Agent Composition A-2. Using this, a coating composition sample (No. 5) as indicated in Table 1 below was obtained in the same manner as in Comparative Example 1. The results of evaluation of the sample are shown in Table 1.

Example 2

A water-repellent fine silica powder (AEROSIL R-972: manufactured by Nippon Aerosil K.K.) was added to a fine powder of Hardening Agent Composition B in an amount of 1% by weight of the latter fine powder and dry-blended in a Henschel mixer. The resulting fine powder blend was subjected to the environmental test conditions described above, and the thus tested sample is called Hardening Agent Composition B-2. Using this, a coating composition sample (No. 6) as indicated in Table 1 below was obtained in the same manner as in Comparative Example 1. The results of evaluation of the sample are shown in Table 1.

Example 3

A water-repellent fine silica powder (TULLANOX TM-500: manufactured by Gunze Ltd.) was added to a fine powder of Hardening Agent Composition B in an amount of 1% by weight of the latter fine powder and dry-blended with a Henschel mixer. The resulting fine powder blend was subjected to the environmental test conditions described above, and the thus tested sample is called Hardening Agent Composition B-3. Using this, a coating composition sample (No. 7) as indicated in Table 1 below was obtained in the same manner as in Comparative Example 1. The results of evaluation of the sample are shown in Table 1.

Example 4

A cooled solid of the molten blend as prepared in Manufacture Example 1 (of manufacturing Hardening Agent Composition A) was coarsely pulverized into granules having a grain size of several mm by the use of an atomizer, and the resulting granules were blended with 3% by weight, on the basis of the granules, of a water-repellent fine silica powder (AEROSIL R-972) by the use of a pin-mill type grinder to obtain a fine powder having a size of Tyler sieve of 100-mesh cut. The resulting fine powder blend was then subjected to the environmental test conditions described above, and the thus tested sample is called Hardening Agent Composition A-3. Using this, a coating composition sample (No. 8) as indicated in Table 1 below was obtained in the same manner as in Comparative Example 1. The results of evaluation of the sample are shown in Table 1.

Example 5

3-Aminopropyltriethoxysilane A-1100 (manufactured by Nippon Unicar Co., Ltd.) was added to a fine powder of Hardening Agent Composition B in an amount of 0.5% by weight of the powder and then dry-blended in a Henschel mixer.

The resulting fine powder blend was subjected to the environmental test conditions described above, and the thus tested sample is called Hardening Agent Composition B-4. Using this, a coating composition sample (No. 9) as indicated in Table 1 below was obtained in the same manner as in Comparative Example 1. The results of evaluation of the sample are shown in Table 1.

Example 6

Dimethoxydiethoxysilane D5600 (manufactured by Chisso Corp.) was added to a fine powder of Hardening Agent Composition B in an amount of 0.5% by weight of the powder and dry-blended in a Henschel mixer.

The resulting fine powder blend was subjected to the environmental test conditions described above, and the thus tested sample is called Hardening Agent Composition B-5. Using this, a coating composition sample (No. 10) as indicated in Table 1 below was obtained in the same manner as in Comparative Example 1. The results of evaluation of the sample are shown in Table 1.

Example 7

An amino-modified silicone oil SF8417 (manufactured by Toray Silicone Co.) was added to a fine powder of Hardening Agent Composition B in an amount of 0.5% by weight of the powder and dry-blended in a Henschel mixer.

The resulting fine powder blend was subjected to the environmental test conditions described above, and the thus tested sample is called Hardening Agent Composition B-6. Using this, a coating composition sample (No. 11) as indicated in Table 1 below was obtained in the same manner as in Comparative Example 1. The results of evaluation of the sample are shown in Table 1.

TABLE 1 (1)

| | Sample No. | | | | | |
|---|---|---|---|---|---|---|
| | 1* | 2* | 3* | 4* | 5 | 6 |
| Amount of Ingredients (parts by weight) | | | | | | |
| Epoxy Resin A | 80.0 | 80.0 | 80.0 | 80.0 | 80.0 | 80.0 |
| Epoxy Resin B | 20.0 | 20.0 | 20.0 | 20.0 | 20.0 | 20.0 |
| Hardening Agent A | 30.0 | | | | | |
| Hardening Agent B | | 30.0 | | | | |
| Hardening Agent A-1 | | | 30.0 | | | |
| Hardening Agent B-1 | | | | 30.0 | | |
| Hardening Agent A-2 | | | | | 30.3 | |
| Hardening Agent B-2 | | | | | | 30.3 |
| Environmental Test Load to Hardening Agent Composition | No | No | Yes | Yes | Yes | Yes |
| Moisture-Resistance Treatment of Hardening Agent | No | No | No | No | Yes | Yes |

TABLE 1 (1)-continued

|  | Sample No. | | | | | |
| --- | --- | --- | --- | --- | --- | --- |
|  | 1* | 2* | 3* | 4* | 5 | 6 |
| Composition | | | | | | |
| 150° C. Gelling-Time (sec) | 62.0 | 56.0 | 58.0 | 52.0 | 63.0 | 56.0 |
| Horizontal Melt Flow Rate (%) | 17.0 | 17.0 | 19.5 | 18.0 | 15.0 | 15.0 |
| Storage Stability | | | | | | |
| Retentiveness (T) | | | | | | |
| After 2 weeks | 96.8 | 94.5 | 70.5 | 75.0 | 90.0 | 91.0 |
| After 5 weeks | 90.0 | 86.0 | 60.0 | 68.0 | 80.4 | 83.0 |
| Retentiveness (R) | | | | | | |
| After 2 weeks | 88.2 | 76.0 | 60.0 | 65.0 | 81.0 | 83.0 |
| After 5 weeks | 81.5 | 69.0 | 48.7 | 50.3 | 70.0 | 75.6 |
| Evaluation of Storage Stability | ◉ | ○ | △ | ○ | ○ | ○ |
| Evaluation of Coat Appearance (1) | A | A | B2 | B1 | A | A |
| Evaluation of Coat Appearance (2) | A | A | C | B2 | B1 | A |

Note: Asterisked numbers indicate comparative examples.

TABLE 1 (2)

|  | Sample No. | | | | |
| --- | --- | --- | --- | --- | --- |
|  | 7 | 8 | 9 | 10 | 11 |
| Amount of Ingredients (parts by weight) | | | | | |
| Epoxy Resin A | 80.0 | 80.0 | 80.0 | 80.0 | 80.0 |
| Epoxy Resin B | 20.0 | 20.0 | 20.0 | 20.0 | 20.0 |
| Hardening Agent B-3 | 30.3 | | | | |
| Hardening Agent A-3 | | 30.5 | | | |
| Hardening Agent B-4 | | | 30.15 | | |
| Hardening Agent B-5 | | | | 30.15 | |
| Hardening Agent B-6 | | | | | 30.15 |
| Environmental Test Load to Hardening Agent Composition | Yes | Yes | Yes | Yes | Yes |
| Moisture-Resistance Treatment of Hardening Agent Composition | Yes | Yes | Yes | Yes | Yes |
| 150° C. Gelling Time (sec) | 56.0 | 56.0 | 51.0 | 59.0 | 54.0 |
| Horizontal Melt Flow Rate (%) | 15.2 | 17.0 | 13.0 | 20.0 | 15.7 |
| Storage Stability | | | | | |
| Retentiveness (T) | | | | | |
| After 2 weeks | 91.5 | 83.4 | 80.0 | 88.0 | 83.0 |
| After 5 weeks | 87.5 | 72.0 | 73.2 | 86.0 | 76.0 |
| Retentiveness (R) | | | | | |
| After 2 weeks | 85.0 | 73.0 | 74.0 | 82.5 | 73.5 |
| After 5 weeks | 80.3 | 66.3 | 67.8 | 73.0 | 68.0 |
| Evaluation of Storage Stability | ○ | ○ | ○ | ○ | ○ |
| Evaluation of Coat Appearance (1) | A | A | A | A | A |
| Evaluation of Coat Appearance (2) | A | B1 | B1 | A to B1 | A to B1 |

Comparative Example 5

A fresh sample of Hardening Agent Composition C from Manufacture Example 3 was blended with epoxy resins as indicated in Table 2 below and formed into a coating composition sample (No. 12) in the same manner as in Comparative Example 1. The results of evaluation of the powdery coating composition are shown in Table 2.

Comparative Example 6

A fine powder of Hardening Agent Composition C was subjected to the environmental test conditions described above, and the thus tested sample is called Hardening Agent Composition C-1. Using this, a coating composition sample (No. 13) as indicated in Table 2 below was obtained in the same manner as in Comparative Example 1. The results of evaluation of the sample are shown in Table 2.

Example 8

A water-repellent fine silica powder (AEROSIL R-972: manufactured by Nippon Aerosil K.K.) was added to a fine powder of Hardening Agent Composition C in an amount of 1% by weight of the latter fine powder and dry-blended in a Henschel mixer. The resulting fine powder blend was subjected to the environmental test conditions described above, and the thus tested sample is called Hardening Agent Composition C-2. Using this, a coating composition sample (No. 14) as indicated in Table 2 below was obtained in the same manner as in Comparative Example 1. The results of evaluation of the sample are shown in Table 2.

Example 9

3-Aminopropyltriethoxysilane A-1100 (manufactured by Nippon Unicar Co. Ltd.) was added to a fine powder of Hardening Agent Composition C in an amount of 0.5% by weight of the powder and then dry-blended in a Henschel mixer.

The resulting fine powder blend was subjected to the environmental test conditions described above, and the thus tested sample is called Hardening Agent Composition C-3. Using this, a coating composition sample (No. 15) as indicated in Table 2 below was obtained in the same manner as in Comparative Example 1. The results of evaluation of the sample are shown in Table 2.

TABLE 2

|  | Sample No. | | | |
| --- | --- | --- | --- | --- |
|  | 12* | 13* | 14 | 15 |
| Amount of Ingredients (parts by weight) | | | | |
| Epoxy Resin A | 80.0 | 80.0 | 80.0 | 80.0 |
| Epoxy Resin B | 20.0 | 20.0 | 20.0 | 20.0 |
| Hardening Agent C | 29.0 | | | |
| Hardening Agent C-1 | | 29.0 | | |
| Hardening Agent C-2 | | | 29.29 | |
| Hardening Agent C-3 | | | | 29.15 |
| Environmental Test Load to Hardening Agent Composition | No | Yes | Yes | Yes |
| Moisture-Resistance Treatment of Hardening Agent Composition | No | No | Yes | Yes |
| 150° C. Gelling-Time (sec) | 58.0 | 51.4 | 56.6 | 55.0 |
| Horizontal Melt Flow Rate (%) | 20.0 | 15.0 | 18.0 | 17.5 |
| Storage Stability | | | | |
| Retentiveness (T) | | | | |
| After 2 weeks | 75.0 | 58.0 | 76.0 | 73.0 |
| After 5 weeks | 55.7 | 37.0 | 58.0 | 56.5 |
| Retentiveness (R) | | | | |
| After 2 weeks | 65.5 | 43.0 | 67.0 | 67.0 |
| After 5 weeks | 55.0 | 28.5 | 55.0 | 58.5 |
| Evaluation of Storage Stability | ○ | △ | ○ | ○ |
| Evaluation of Coat Appearance (1) | A | B1 | A | A |
| Evaluation of Coat Appearance (2) | A | C | A | B1 to A |

Note: Asterisked numbers indicate comparative examples.

While the invention has been described in detail and with reference to specific embodiments thereof, it will be apparent to one skilled in the art that various changes and modifications can be made therein without departing from the spirit and scope thereof.

What is claimed is:

1. A hardening agent composition for epoxy resins in the form of powdery grains, comprising a hardening agent, a hardening promoter, a zeolite and at least one additive selected from the group consisting of a water-repellent fine silica powder, a silane coupling agent and a polysiloxane compound, whereby the additive is adhered to the surfaces of the powdery grains.

2. The hardening agent composition for epoxy resins as in claim 1, in which the zeolite has a pore diameter of about 5 Å or less, and the hardening promoter is selected from the group consisting of triphenylphosphine, diphenylphosphine, 1-methylimidazole, 2-methylimidazole, 1-benzyl-2-methylimidazole, 1-phenylimidazole, 2-phenylimidazole, 1,8-diazabicyclo(5,4,0)-undecene-7,2-(dimethylaminomethyl)-phenol, and 2,4,6-tris(dimethylaminomethyl)phenol.

3. The hardening agent composition for epoxy resins as in claim 1, in which the zeolite has a pore diameter of about 10 Å, and the hardening promoter is selected from the group consisting of triphenyl phosphine, tri-m-tolylphosphine or 2,4-diamino-6-[2'-methylimidazolyl(1)]ethyl-S-triazine.

4. The hardening agent composition for epoxy resins as in claim 1, in which the proportion of the hardening promoter is from 3 to 50 parts by weight to 100 parts by weight of zeolite.

5. The hardening agent composition for epoxy resins as in claim 4, in which the proportion of the hardening promoter is from 10 to 30 parts by weight to 100 parts by weight of zeolite.

6. The hardening agent composition for epoxy resins as in claim 1, in which the proportion of the hardening agent is at least 10 parts by weight to 100 parts by weight of zeolite.

7. The hardening agent composition for epoxy resins as in claim 6, in which the proportion of the hardening agent is from 50 to 500 parts by weight to 100 parts by weight of zeolite.

8. The hardening agent composition for epoxy resins as in claim 1, in which the water-repellent fine silica powder comprises fine silica grains having hydrophobic groups bonded on the surfaces thereof, and said silica grains have a primary mean grain size of from 10 to 100 nm.

9. The hardening agent composition for epoxy resins as in claim 8, in which said silica grains have a primary mean grain size of from 10 to 30 nm.

10. The hardening agent composition for epoxy resins as in claim 1, in which the silane coupling agent is a silicon compound having a polar group and is liquid or solid at room temperature.

11. The hardening agent composition for epoxy resins as in claim 10, in which said polar group is selected from the group consisting of an amino group, and amido group, a carboxyl group, an alkoxy group and a halogen.

12. The hardening agent composition for epoxy resins as in claim 1, in which the polysiloxane compound has a polysiloxane bond in its molecule and is liquid or solid at room temperature.

13. The hardening agent composition for epoxy resins as in claim 12, in which the polysiloxane compound is represented by formula (I):

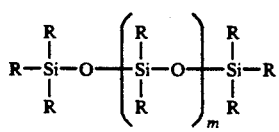

(I)

wherein R represents a monovalent hydrocarbon group, and m represents a positive integer.

14. The hardening agent composition for epoxy resins as in claim 12, in which the polysiloxane compound is represented by formula (II):

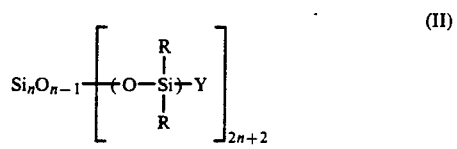

(II)

wherein R represents a monovalent hydrocarbon group, Y represents —H, —OH, —OR$^1$,

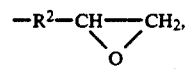

—R$^2$—NH$_2$, —R$^2$—COOH, or —R$^2$—OH, R$^1$ represents a monovalent aliphatic or aromatic hydrocarbon group, R$^2$ represents a divalent aliphatic or aromatic hydrocarbon group, and m and n each represents a positive integer.

15. The hardening agent composition for epoxy resins as in claim 12, in which the polysiloxane compound is represented by formula (III):

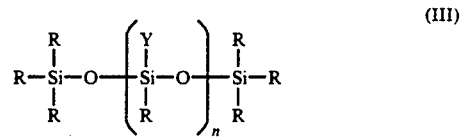

(III)

wherein R represents a monovalent hydrocarbon group, Y represents —H, —OH, —OR$^1$,

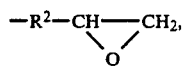

—R$^2$—NH$_2$, —R$^2$—COOH, or —R$^2$—OH, R$^1$ represents a monovalent aliphatic or aromatic hydrocarbon group, R$^2$ represents a divalent aliphatic or aromatic hydrocarbon group, and n represents a positive integer.

16. The hardening agent composition for epoxy resins as in claim 12, in which the polysiloxane compound is represented by formula (IV):

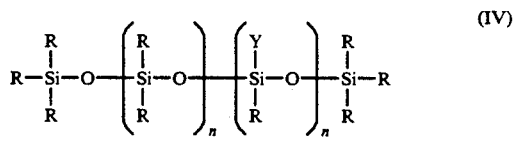

(IV)

wherein R represents a monovalent hydrocarbon group, Y represents —H, —OH, —OR$^1$,

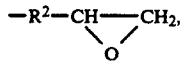

—R—NH$_2$, —R$^2$—COOH, or —R$^2$—OH, R$^1$ represents a monovalent aliphatic or aromatic hydrocarbon group, R$^2$ represents a divalent aliphatic or aromatic hydrocarbon group, and n represents a positive integer.

17. The hardening agent composition for epoxy resins as in claim 1, in which the amount of the additive is from 0.1 to 5% by weight to the total weight of the hardening agent composition.

18. The hardening agent composition for epoxy resins as in claim 1, in which the amount of the additive is from 0.5 to 3.0% by weight to the total weight of the hardening agent composition.

* * * * *